Dec. 1, 1959  J. B. NIX  2,914,891
APPARATUS FOR SEVERING PIPE
Filed July 22, 1957  2 Sheets-Sheet 1

INVENTOR.
JOE B. NIX
BY
Horace B. Van Valkenburgh
ATTORNEY

Dec. 1, 1959  J. B. NIX  2,914,891
APPARATUS FOR SEVERING PIPE
Filed July 22, 1957  2 Sheets-Sheet 2

INVENTOR.
JOE B. NIX
BY
Horace B. Van Valkenburgh
ATTORNEY

United States Patent Office 2,914,891
Patented Dec. 1, 1959

2,914,891

APPARATUS FOR SEVERING PIPE

Joe B. Nix, Pueblo, Colo.

Application July 22, 1957, Serial No. 673,311

8 Claims. (Cl. 51—241)

This invention relates to apparatus for severing pipe, and more particularly pipe which is relatively thick or relatively hard, such as pipe formed of cast iron, stainless steel, ceramic, "transite" or compressed asbestos, or the like.

Conventional pipe cutting devices, used for many years, include an arcuate bracket having a pair of cylindrical rollers mounted on one side and a V-edged cutting wheel pivotally mounted on the opposite side and adapted to be moved inwardly against the pipe by a threaded handle, by which the device is turned around the pipe. A V-groove is produced by the cutting wheel and is enlarged and deepened as the device is turned around the pipe and the cutting wheel is moved inwardly. However, the use of such a device is limited to relatively thin-walled pipe or tubing of relatively small diameter and formed of material considerably softer than cast iron, for instance, such as soft steel pipe or tubing or galvanized pipe. Thin-walled tubing may be readily cut by a saw, but to cut thicker pipe or tubing and particularly pipe or tubing formed of relatively hard material, such as cast iron, and having relatively thick walls, such as in excess of ½", requires an undue amount of time to cut with a saw. Machines for cutting larger and heavier wall pipe have been devised, but such machines have been inconvenient to use and have also required an undue amount of time. For instance, a machine in which a circular saw is rotated by a motor, while a pair of chains encircles the pipe and the saw is driven around the pipe by pinions engaging the chains and driven by the motor, so that the saw may first cut through the pipe at one point and then be moved around the pipe, is excessive in weight and initial cost, as well as replacement cost of saws. A pipe cutting tool which is mounted for movement around the pipe and utilizes a machine tool fed inwardly by a screw and rotated by hand around the pipe requires undue effort for rotation and is not satisfactory in operation. Also, a pipe cutter which includes an annular chain-like member supporting a series of chisels extending around the periphery of the pipe, the chisels being struck by hammer in succession, devised especially for cutting cast iron pipes, requires an undue amount of time to cut through a pipe of even medium thickness, and also, if considerable care is not exercised by the operator, tends to produce a rough uneven kerf or even break off pieces of the pipe inwardly from the cross section through which the cut is to be made.

Among the objects of the present invention are to provide a novel apparatus for severing pipe, particularly pipe having a relatively thick wall and formed of relatively hard material, such as cast iron, stainless steel, ceramic and the like; to provide such apparatus which is sufficiently light in weight that it may be readily operated by a single operator; to provide such apparatus which performs the severing operation in a minimum amount of time; to provide such apparatus which produces a clean cut or kerf; to provide such apparatus which is relatively economical to build and use; and to provide such a method and apparatus which will be effective in use.

Additional objects and the novel features of this invention will become apparent from the description which follows, taken in connection with the accompanying drawings, in which:

Fig. 5 is a fragmentary section, at approximately full scale, of a portion of a pipe being cut and illustrating the manner in which a succession of cuts are preferably made in accordance with this invention.

Figure 1:
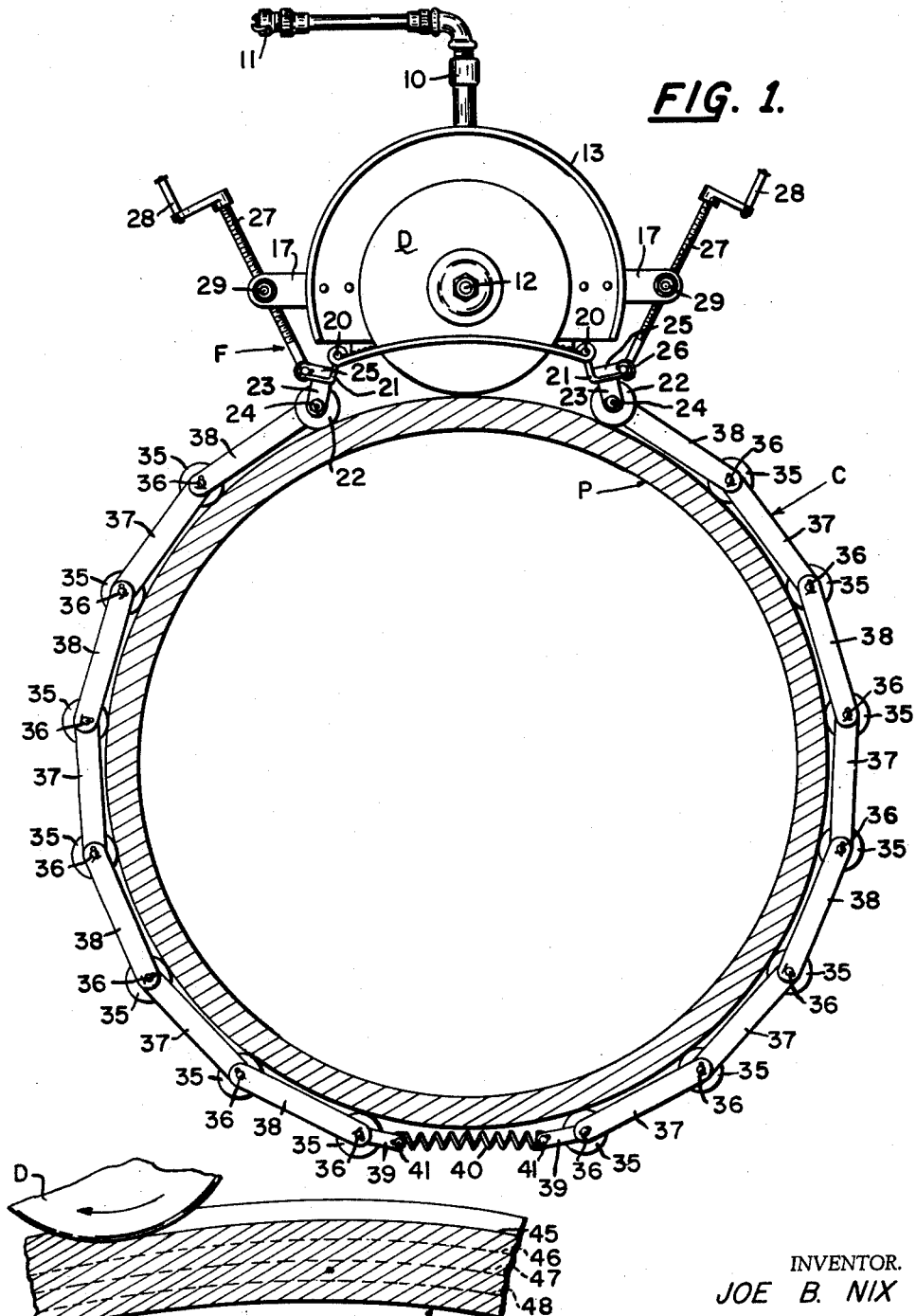
Fig. 1 is a front elevation of apparatus constructed in accordance with this invention mounted on a pipe to be severed, the pipe being shown in section.
Figure 2:
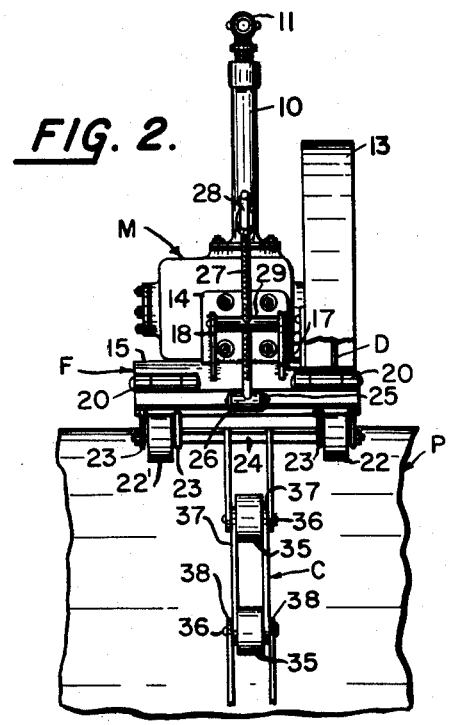
Fig. 2 is a side elevation of the upper portion of the apparatus of Fig. 1.
Figure 3:
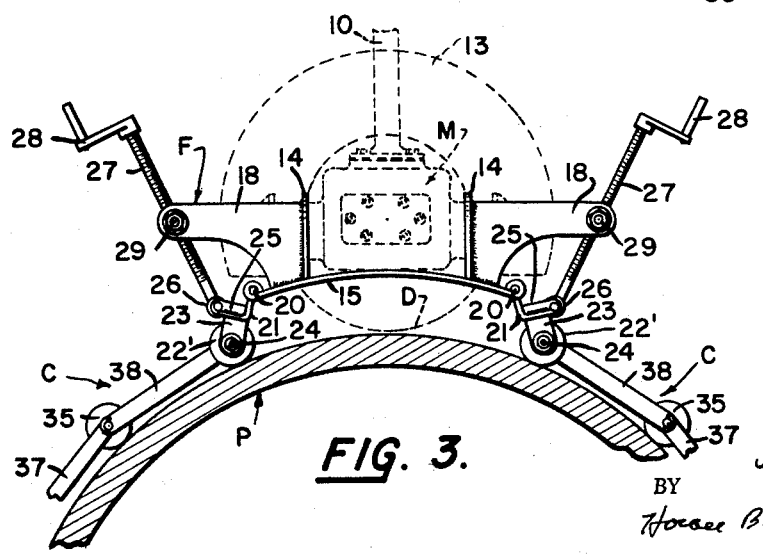
Fig. 3 is a rear elevation of the upper portion of the apparatus of Fig. 1.

As illustrated in Figs. 1 and 2, apparatus constructed in accordance with this invention may comprise a framework F associated with a chain arrangement C adapted to encircle a pipe P, the framework and chain arrangement being constructed for movement around the pipe when the latter is stationary or rotation of the pipe while the framework and chain arrangement remain stationary, or any combination thereof. The framework F supports a motor M which rotates a grinding disk D and the framework is adjustable to move the motor and cutting disk toward and away from the pipe P. Pipe P may be a relatively thick-walled, comparatively large diameter pipe of relatively hard material, such as cast iron, stainless steel, ceramic or the like, while disk D may be on the order of one-eighth inch in thickness and formed of "Carborundum" or any other suitable material adapted to remove, as by grinding, material from the pipe as the disk is rotated and moved relatively around the pipe. The motor M may be an air motor, as shown, having an air intake pipe 10 provided with a conventional hose connection 11 at a suitable position. The disk D is removably mounted on the motor shaft 12 in a conventional manner, while the motor may also be provided with a conventional guard 13. Motor M may be mounted, as by studs or cap screws, between a pair of upstanding brackets 14, which may be welded to an outwardly bowed or arcuate plate 15 of the framework F, plate 15 being conveniently provided with a slot 16, as in Fig. 4, through which the cutting disk D may extend. The framework F may also include front arms 17 and rear arms 18, each connected to the respective bracket 14, as by welding, with the arms 18 also conveniently extending to plate 15 and being attached thereto, as by welding, for reinforcement purposes, as in Fig. 3.

Figure 4:
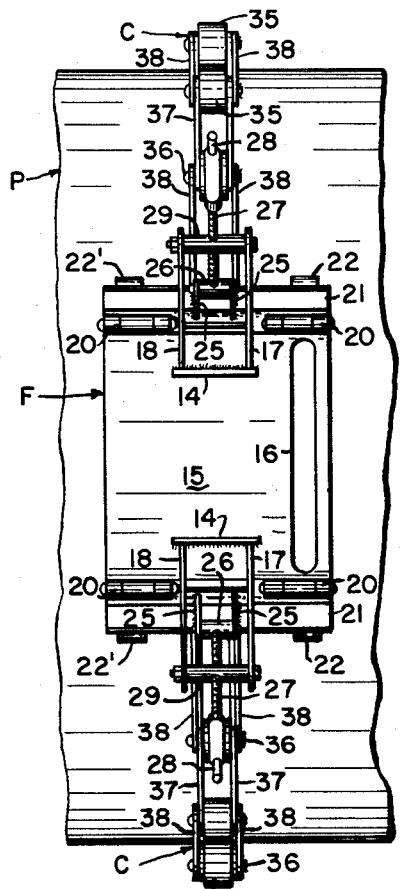
Fig. 4 is a top plan view of a framework forming a part of the apparatus of Fig. 1 mounted on a pipe.

Plate 15, as in Figs. 1 and 4, may be connected at each side by a pair of hinges 20 with a bar 21, such as an angle, each of which is mounted on a pair of rollers 22 and 22' adapted to engage the pipe P. Thus, each bar 21 may be provided on its underside with a pair of ears 23 for each roller 22 and 22', between which extends a pin 24 on which the respective rollers are mounted. In addition, the top of each bar 21 may be provided with a pair of ears 25 between which a block 26 is pivotally mounted, block 26 being adapted to receive the inner end of a threaded rod 27 for rotation relatively thereto, while rod 27 may be provided with a handle 28 at its outer end for turning rod 27 to adjust the position of the disk D inwardly and outwardly with respect to the pipe P. For the latter purpose, the threaded portion of each rod 27 engages a threaded hole in a block 29, pivotally mounted between arms 17 and 18.

The rods 27 may both be adjusted inwardly for each cut, as described later, or they may be adjusted inwardly alternately, for alternate cuts, since the bars 21 need not be tipped to the same extent for positioning the inner edge of disk D at an appropriate position.

The chain arrangement C, as in Figs. 1 and 2, may comprise a series of rollers 35, adapted to engage the pipe P and each mounted on a pin 36 which extends between the pivotal intersection of pairs of outer links 38 and inner links 37, the links 37 and 38 alternating between rollers 35, as shown. The links 38 adjacent the framework F are pivotally connected at their inner ends to pin 24. At a diametrically opposite position relative to the pipe P, as in Fig. 1, a pair of short links 39 may be connected to each of the adjacent pins 36 and a heavy coil spring 40 connected between the links 39, as by engagement with a pin 41 extending between each pair of links 39. Preferably, the pins 36 are removable so that the number of rollers 35 may be adjusted in accordance with the diameter of the pipe, with the springs 40 accommodating variations between the circumference of the pipe and the use of one roller 35 more or one roller 35 less. Of course, the spring 40 need not be positioned exactly diametrically opposite the framework F, but only approximately so, and one roller 35 more on one side than on the other side of the chain arrangement may be used. For installing the apparatus upon a pipe, a clamping device of any suitable construction may be used in pulling the short links 39 toward each other and simultaneously stretching spring 40, so that the ends thereof may be readily engaged with the pins 41. The disk D, as in Fig. 2, is conveniently positioned so as to be approximately centered relative to the rollers 22, so that the rollers 22 will tend to bridge the cut being made. Also, the chain arrangement C is conveniently positioned centrally with respect to the framework F, although it may be positioned closer to the rollers 22 than the rollers 22', if desired. Of course, the chain arrangement may be constructed in any other suitable manner, as by extending around the pipe and connected to the framework F by a spring at each side of the latter. Also, the motor M may be installed so as to be adjustable inwardly and outwardly of the framework F, with a corresponding adjustment of the disk D, particularly for smaller sizes of pipe, such as 6 in. in diameter, in which event the rollers 22 and 22' may be rigidly secured to the framework F, which may be made less in width between the rollers. The apparatus may be made in different sizes for different ranges of pipe sizes, such as one size for pipe of 6, 8, 10 and 12 in. diameters, another size for 12, 16 and 24 in. diameters and another size for 24 and 36 in. diameters, the overlap in ranges being primarily for the convenience of the user.

In utilizing the apparatus of this invention, the apparatus is mounted on a pipe in the manner illustrated in Fig. 1, with the disk D clearing the pipe P, after which the air hose for supplying air to the motor M may be connected, if not already connected, and the motor turned on. Then, the framework F may be adjusted by turning the rods 27 until the disk D engages the pipe and then cuts into the pipe for a distance of approximately ⅛ in. Then, the entire apparatus may be moved around the pipe so that the disk D will cut a groove, such as groove 45 of Fig. 5, having a depth of approximately ⅛ in. After the first groove 45 is cut, the rods 27 may be again adjusted so that the disk D will cut into the pipe a further distance of between ⅛ and ¼ inch, whereupon the apparatus may again be moved around the pipe so as to deepen the groove to the depth of dotted line 46 of Fig. 5. Similarly, the rods 27 are adjusted for each subsequent cut of ⅛ to ¼ in., so as to cut, during the subsequent movements of the apparatus around the pipe, to the depth of the dotted lines 47 and 48 of Fig. 5 and then completely through the pipe, assuming the pipe has a wall thickness of approximately 1 in. Of course, for other wall thicknesses, the number of cuts made around the pipe will vary in accordance with the wall thickness of the pipe, it being understood that the initial cut is preferably of a minimum depth, i.e., approximately ⅛ in., while the remaining cuts may each be slightly greater, i.e., from ⅛ in. up to ¼ in. The movement of the apparatus around the pipe is preferably such that the disk D will rotate into the material to be removed, such as movement from right to left with the disk D rotating in the direction of the arrow of Fig. 5, although the opposite direction of movement may be utilized, if desired. The disk D also should be rotated at a sufficiently high rate of speed, such as from 4,000 to 6,000 r.p.m., so that each cut is readily made and without tending to slow down the motor M.

It will be understood, of course, that an electrical motor may be substituted for the air motor M, although this will ordinarily increase the weight of the apparatus and also cannot be used for an underground water main, since water in the excavation or in the pipe will produce danger to the operator. Thus, with an air motor, the total weight of the apparatus, including the motor M and disk D, the framework F and the chain arrangement C, may be such that the apparatus is easily handled for movement around the pipe by a single operator. Also, spring 40 may be sufficiently strong that when the disk D reaches the underside of the pipe, a substantial portion of the weight will be supported by the chain arrangement C, although it is desirable that the operator hold the framework against the pipe during traverse of the underside thereof. It will be noted that the most successful previous machine for cutting cast iron pipe includes two chains encircling the pipe and passing over pinions driven by a motor, the motor frame being mounted on rollers and the motor driving a circular saw, with the motor chassis being adjusted so that the saw will initially cut through the pipe and the motor and saw are then driven around the pipe, weighs approximately 395 pounds and costs, at present prices, approximately $4,200.00. However, apparatus constructed in accordance with this invention, with a chain arrangement C sufficient to encircle a 12 in. pipe, weighs only 50 lbs., when provided with a conventional air motor, and may be made for less than one-tenth of the cost of such prior device.

It will be understood, of course, that the pipe P may be supported, as by rollers, and rotated by hand or by a suitable rotating device, so that the framework F may remain relatively stationary on top of the pipe while the pipe turns. However, one advantage of the present apparatus is that it may be taken to the job and the pipe cut on the job, whether the pipe is above or below ground. If the pipe is above ground, it is conveniently supported on timbers, blocks, or the like, so that the air connection for the motor will clear the ground as the disk D passes around the underside of the pipe. For cutting pipe below ground, a space at the position of the section at which the pipe is to be severed is excavated sufficiently that the air connection for the motor will clear while the apparatus is moved around the pipe. The relatively shallow cuts may be started on top of the pipe, as before, and the framework F and motor M with disk D moved around the pipe to the starting position for each individual cut, although when a water pipe is in a service line, particularly when a section of pipe is to be removed, as for installation of a branch line, it may be desirable to start the last cut, through the pipe, at the bottom, so that any water in the pipe may drain. Also, it may be desirable to move the framework and disk from the top to the bottom of the pipe on one side, then on the other side, to avoid wrapping the air hose around the pipe.

Although a preferred embodiment of this invention has been illustrated and described, it will be understood that other embodiments may exist and various changes may be made therein, all without departing from the spirit and scope of this invention.

What is claimed is:

1. Apparatus for severing pipe formed of relatively hard material, comprising a framework including a plate, rollers engaging said pipe at each side of said plate and a member at each side of said plate pivotally connecting said plate with the respective roller; a motor mounted on said framework; a disk rotated by said motor and adapted, while rotating, to remove material from said pipe to a predetermined depth and width during movement around said pipe; means for adjusting the angular position of said member at each side of said plate, so as to adjust the position of said motor and said disk inwardly and outwardly with respect to said pipe; and means encircling said pipe and connected to said pivoted members at said rollers on opposite sides of said framework, said encircling means being movable around said pipe with said framework and including resilient means generally opposite said framework for maintaining said rollers and said encircling means in engagement with said pipe.

2. Apparatus as defined in claim 1, wherein said framework is provided with front and rear rollers at each side; and said adjusting means is disposed generally centrally between said rollers at each side of said framework.

3. Apparatus as defined in claim 1, including upstanding brackets mounted on said plate and adapted to receive said motor therebetween; at least one arm extending laterally from each bracket, said adjusting means connecting the outer end of the respective arm and the corresponding member.

4. Apparatus as defined in claim 3, wherein each said adjusting means includes a threaded rod and a handle for said rod.

5. Apparatus as defined in claim 1, wherein said plate is provided with a slot through which said disk extends.

6. Apparatus as defined in claim 5, wherein said framework is provided with a roller at each side in alignment with said slot.

7. Apparatus as defined in claim 1, wherein said disk is formed of "Carborundum."

8. Apparatus for circumferentially severing a pipe formed of relatively hard material, such as cast iron, stainless steel, ceramic and the like, comprising an outwardly bowed plate having a slot therein adjacent the front edge thereof; a pair of upstanding brackets disposed in spaced lateral relation centrally of said plate; a pair of arms extending laterally from each said bracket, at least one of said arms of each pair being also connected to said plate; at least one hinge at each side of said plate; an angle at each side of said plate, each angle being attached to said hinge and thereby being pivotally connected to said plate; a pair of rollers carried by each said angle and adapted to engage said pipe, said rollers being disposed adjacent the planes of the front and rear edges of said plate and the front rollers being in alignment with said slot; a first block pivotally connected to each said angle at a position generally central thereof; a second block pivotally connected between each pair of said arms adjacent the outer ends thereof; a pair of threaded rods, the lower end of each rod being rotatably connected to one of said first blocks and the threads thereof engaging the corresponding second block, each threaded rod having a handle at the outer end thereof for rotation to cause pivotal movement of said angle relative to said plate and thereby adjustment of the position of said plate inwardly and outwardly with respect to said pipe; a motor mounted between said upstanding brackets; a disk rotated by said motor and extending through said slot, said disk being adapted, while rotating, to remove material by grinding from said pipe for a predetermined width and depth during movement of said disk around said pipe; a series of pairs of links pivotally connected together by pins and extending around said pipe on each side of said angles, the uppermost of said links being pivotally connected to said angles and the lowermost of said links being connected together by a spring at a position generally opposite said plate; and a series of rollers mounted on said pins for engaging said pipe.

References Cited in the file of this patent

UNITED STATES PATENTS

| 1,256,799 | Hime | Feb. 19, 1918 |
| 2,027,132 | Webster | Jan. 7, 1936 |
| 2,076,833 | Webster | Apr. 13, 1937 |
| 2,291,395 | Levey | July 28, 1942 |
| 2,716,280 | Ruhe | Aug. 30, 1955 |

FOREIGN PATENTS

| 732,455 | Great Britain | June 22, 1955 |